United States Patent
Mori et al.

(10) Patent No.: US 9,915,363 B2
(45) Date of Patent: Mar. 13, 2018

(54) CHECK VALVE

(71) Applicant: EAGLE INDUSTRY CO., LTD., Tokyo (JP)

(72) Inventors: Koichi Mori, Tokyo (JP); Shinji Nishida, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 71 days.

(21) Appl. No.: 14/899,074

(22) PCT Filed: Sep. 30, 2014

(86) PCT No.: PCT/JP2014/075981
§ 371 (c)(1),
(2) Date: Dec. 16, 2015

(87) PCT Pub. No.: WO2015/050091
PCT Pub. Date: Apr. 9, 2015

(65) Prior Publication Data
US 2016/0123484 A1 May 5, 2016

(30) Foreign Application Priority Data
Oct. 2, 2013 (JP) .................................. 2013-207372

(51) Int. Cl.
 F16K 15/08 (2006.01)
 F16K 15/02 (2006.01)
 F16K 47/02 (2006.01)

(52) U.S. Cl.
 CPC ............ F16K 15/08 (2013.01); F16K 15/026 (2013.01); F16K 47/023 (2013.01)

(58) Field of Classification Search
 CPC .............................. F16K 15/023; F16K 15/063
 (Continued)

(56) References Cited

U.S. PATENT DOCUMENTS

| 2,208,188 A | 7/1940 | Johnston |
| 7,448,408 B2 * | 11/2008 | Yumoto ................ F16K 15/063 137/533.25 |

FOREIGN PATENT DOCUMENTS

| JP | S62-228679 A | 10/1987 |
| JP | H07189909 A | 7/1995 |

(Continued)

OTHER PUBLICATIONS

Chinese Office Action dated Dec. 2, 2016.
Korean Office Action dated Jan. 31, 2017 with English translation.

*Primary Examiner* — Craig Schneider
*Assistant Examiner* — P. Macade Nichols
(74) *Attorney, Agent, or Firm* — Harness, Dickey & Pierce, P.L.C.

(57) ABSTRACT

A check valve (100) that opens and closes by causing a valve element (112) to come into contact with and separate from a valve seat (104) and thereby controls a flow of fluid that flows in through an inlet (101) and flows out through an outlet (102). The check valve (100) has: the inlet (101) provided at a downside thereof; the outlet (102) provided at an upside thereof; the valve seat (104) formed to surround the inlet (101); the valve element (112) configured to be able to come into contact with and separate from the valve seat (104) vertically; and a guide portion (105) that has a fluid guide surface (118) horizontally guiding a fluid flowing in through the inlet (101), and a valve element guide surface (111) provided on a side surface thereof, the valve element guide surface (111) vertically guiding the valve element.

16 Claims, 12 Drawing Sheets

(58) Field of Classification Search
USPC ............. 137/533.29, 533.27, 543.21, 543.23
See application file for complete search history.

(56) References Cited

FOREIGN PATENT DOCUMENTS

| | | |
|---|---|---|
| JP | 2008-095820 A | 4/2008 |
| JP | 2008-202644 A | 9/2008 |
| JP | 2011-064240 A | 3/2011 |
| JP | 2012-052617 A | 3/2012 |

* cited by examiner

CHECK VALVE

CROSS-REFERENCE TO RELATED APPLICATIONS

This application is a National Stage of International Application No. PCT/JP2014/075981, filed Sep. 30, 2014, which claims priority to Japanese Application No. 2013-207372, filed Oct. 2, 2013. The entire disclosures of each of the above applications are incorporated herein by reference.

FIELD

The present disclosure relates to a check valve.

BACKGROUND

A low-temperature fluid pump for supplying a fluid having a lower liquefaction temperature than air, such as liquid nitrogen, is mostly used for feeding a fluid of a saturated vapor pressure (approximately 77 K at atmospheric pressure), and is often configured to have a low required net positive suction head (required NPSH) for the purpose of preventing vaporization of the fluid by negative pressure or the like. For this reason, it is preferred that a check valve used in a pump have a low flow rate resistance (high flow rate coefficient).

On the other hand, a positive displacement pump such as a bellows pump described in Patent Literature 1 is configured to increase the speed of the pump stroke or, in other words, to reduce the time required in one stroke, so that reduction in size and weight of the pump apparatus, especially the weight of the pump support member or bellows operating shaft, can be realized, as well as reduction of the impact of the heat generated in the drive unit. Therefore, in order to achieve high-speed pump stroke, the time required by a behavior of a check valve used needs to be reduced. Specifically, in case of the poppet check valve described in Patent Literature 2, it is required to reduce the time it takes for the valve element to return by its own weight in a closure stroke. Moreover, a delay of the closure timing leads to a reverse flow of the fluid at valve closure, and the impact of a water hammer caused by the reverse flow is not negligible.

As a way to resolve a delay in valve closure, generally there is means for applying spring force in the return direction of the valve element or reducing the degree of opening of the valve element at valve opening (check valve with a spring, etc.). There is also means, such as the one described in Patent Literature 3, for forcibly closing the valve by using external force of a cam, a solenoid, or the like. However, applying spring force or reducing the degree of opening leads to a relatively low flow rate coefficient of the valve, which means that the valve needs to be enlarged to obtain a required flow rate coefficient, increasing the size of the pump itself. Furthermore, the configuration of forcibly closing the valve makes the mechanism complicated. The conditions of a low-temperature use environment and thermal insulation need to take into consideration, but such requirement makes it difficult to design the pumping mechanism.

The behavior of the valve element of a poppet check valve, on the other hand, is known to have a great impact of the force acting on the valve element due to the momentum of the fluid, as can be seen in the model shown in FIGS. 12A and 12B. FIGS. 12A and 12B are schematic diagrams for explaining the force acting on the valve element of the poppet valve. The force applied to the valve element is not only associated with the differential pressure $\Delta P$ (=P1−P2) between the upstream pressure (P1) and the downstream pressure (P2) in the valve element but is also associated with the momentum of the fluid. The force acting on the valve element of the poppet valve is obtained by the following equation according to the model shown in FIGS. 12A and 12B.

$$F = A \cdot \Delta P + \rho \cdot Q \cdot (V0 - V \cdot \cos \theta) \quad (1)$$

$$V = C/A \cdot \sqrt{(2/\rho \cdot \Delta P)} \quad (2)$$

In these equations, A represents the cross-sectional area of the pipe ($=\pi \cdot d^2/4$), d represents the diameter of the pipe, $\rho$ represents the fluid density, Q represents the flow rate (=V0·A), V0 represents the flow velocity at the upstream, V represents the flow velocity at the valve portion, C represents the flow rate coefficient, and $\theta$ represents the angle formed by the tapered surface of the valve element and the axial line.

The first term on the right side of the equation (1) represents the force caused by the differential pressure $\Delta P$ between the upstream and the downstream, and the second term represents the force caused by the momentum of the fluid. In the structure of a self-weight operated valve, when the lift distance of the valve is substantially great with respect to the flow rate, V≈V0 is established. Therefore, as a result of substituting the equation (2) and making adjustments, the equation (1) becomes as follows.

$$F = 1/2 \cdot \rho \cdot A \cdot V0^2 \cdot 1/C^2 + \rho \cdot A \cdot V0^2 \cdot (1 - \cos \theta) \quad (3)$$

The first term on the right side of the equation (3) represents the force caused by the differential pressure $\Delta P$ between the upstream and the downstream, and the second term represents the force caused by the momentum of the fluid. Compared to a valve that only has the action of the differential pressure $\Delta P$ and the same flow rate coefficient with respect to the lift distance, the level of the force that pushes up the valve element is higher by the level of the force represented by the second term, even when the flow rate is the same. This increases the time it takes for the poppet valve to drop from its position at the maximum lift distance to the valve-closed position by its own weight, creating a delay of the closure timing.

CITATION LIST

Patent Literature

Patent Literature 1: Japanese Patent Application Laid-open No. 2012-52617
Patent Literature 2: Japanese Patent Application Laid-open No. 2008-95820
Patent Literature 3: Japanese Patent Application Laid-open No. S62-228679

SUMMARY

Technical Problem

An object of the present disclosure is to provide a check valve capable of achieving a high-speed valve closing operation with a simple configuration.

Solution to Problem

In order to achieve the foregoing object, the check valve of the present disclosure is a check valve that opens and closes by causing a valve element to come into contact with and separate from a valve seat and thereby controls a flow of fluid that flows in through an inlet and flows out through an outlet, the check valve comprising: an inlet provided at a downside thereof; an outlet provided at an upside thereof; a valve seat formed to surround the inlet; a valve element configured to be able to come into contact with and separate from the valve seat vertically; and a guide portion that has a fluid guide surface provided at a downside thereof, the fluid guide surface horizontally guiding a fluid flown in from the inlet, and a valve element guide surface provided on a side surface thereof, the valve element guide surface vertically guiding the valve element.

According to the present disclosure, the level of force caused by the momentum of the fluid and acting on the valve element can be reduced. The flow direction of the fluid flowing in through the inlet is changed to a generally horizontal direction by the fluid guide surface of the guide portion. Because the force caused by the momentum of the fluid acts horizontally on the vertically moving valve element, the second term on the right side of the equation (3) is reduced. As a result, the force that pushes up the valve element is lowered, as well as the lift distance of the valve element, resulting in a reduction of the time it takes for the valve element to drop from its position at the maximum lift distance to the valve-closed position by its own weight, as well as a delay of the closure timing.

It is preferred that the check valve further have an auxiliary valve element that is configured to be able to be seated on the valve element and the guide portion so as to cover a gap between the valve element and the valve element guide surface when the valve element is seated on the valve seat.

With the two-stage valve structure in which the gap between the valve element and the guide portion is covered with the auxiliary valve element after the valve element is seated, the impact of a water hammer caused by the reverse flow can be reduced. In other words, after the reverse flow rate is reduced with the valve of the first stage (the valve element), the valve of the second stage (the auxiliary valve element) is closed. This configuration can reduce the velocity of the reverse flow at valve closure, from which the magnitude of a water hammer can be estimated.

It is preferred that the auxiliary valve element be mounted to the valve element so as to be able to move vertically within a predetermined range, and a seating surface of the valve element on which the auxiliary valve element is seated and a seating surface of the guide portion on which the auxiliary valve element is seated are at a same height when the valve element is seated on the valve seat.

When the valve element is seated on the valve seat, the auxiliary valve element gradually closes the gap between the valve element and the guide portion, reducing the impact of a water hammer more effectively.

It is preferred that the check valve further have a biasing member for biasing the auxiliary valve element downward toward the valve element and the guide portion.

According to this configuration, a high-speed valve closing operation can be achieved due to the biasing force of the biasing member that acts on the valve element via the auxiliary valve element in a valve closure direction. In addition, by setting the biasing force accordingly, the check valve can be used as a check valve that makes the direction of installation of the check valve opposite to the gravitational direction, i.e., a check valve that lets the fluid flow in one direction from the upper section to the lower section.

It is preferred that the valve element have a pressure receiving surface that extends outward from a lower end of an inner side surface guided by the valve element guide surface, and extends horizontally with respect to the valve seat, or a pressure receiving surface that extends outward from a lower end of an inner side surface guided by the valve element guide surface, in such a manner that a distance between the pressure receiving surface and the valve seat gradually reduces.

According to this configuration, the valve element is provided with a pressure receiving surface extending along a direction generally along the flow direction of the fluid guided by the fluid guide surface. Therefore, almost no force is produced by the momentum of the fluid towards the valve element, and the force acting on the valve element is mostly force resulting from the differential pressure ($\Delta P$) between the pressure generated at the inlet side (the upstream pressure $P1$) and the pressure generated at the outlet side (the downstream pressure $P2$). For this reason, the second term on the right side of the equation (3) can be reduced significantly.

It is preferred that a position of a gap between the valve element and the guide portion be located outside the inlet as viewed vertically.

With this configuration in which the gap between the valve element and the guide portion does not vertically overlap with the inlet, the fluid that is flown in through the inlet changes its flow direction to a horizontal direction first and then flows into the gap. Consequently, the impact of the momentum of the fluid acting on the auxiliary valve element through the gap can be reduced, resulting in a more effective reduction of the impact of a water hammer.

The valve seat may have a first valve seat and a second valve seat that are configured such that flow directions therethrough of a fluid flowing from an upstream to a downstream when the valve is opened are opposite to each other in a horizontal direction, and the valve element has a first valve portion that is to be seated on the first valve seat, a second valve portion that is to be seated on the second valve seat, and a pressure receiving surface that extends from the second valve portion toward the first valve portion and extends between the first valve portion and the second valve portion in such a manner that a distance between the pressure receiving surface and the first valve seat gradually reduces.

According to this configuration, when the valve is opened, the direction in which the fluid flows in the first valve portion and the first valve seat and the direction in which the fluid flows in the second valve portion and the second valve seat becomes opposite to each other. Consequently the level of the force produced by the momentum of the fluid and acting on the valve element can be reduced.

Advantageous Effect of the Disclosure

According to the present disclosure, a high-speed valve closing operation can be achieved with a simple configuration.

DRAWINGS

DETAILED DESCRIPTION

Hereinafter, modes for carrying out the present disclosure will be exemplarily described in detail based on examples thereof with reference to the drawings. However, the dimensions, materials, shapes, relative arrangements and so on of constituent parts described in the examples are not intended to limit the scope of the present disclosure to these alone in particular unless specifically described.

Example 1

Figure 3:
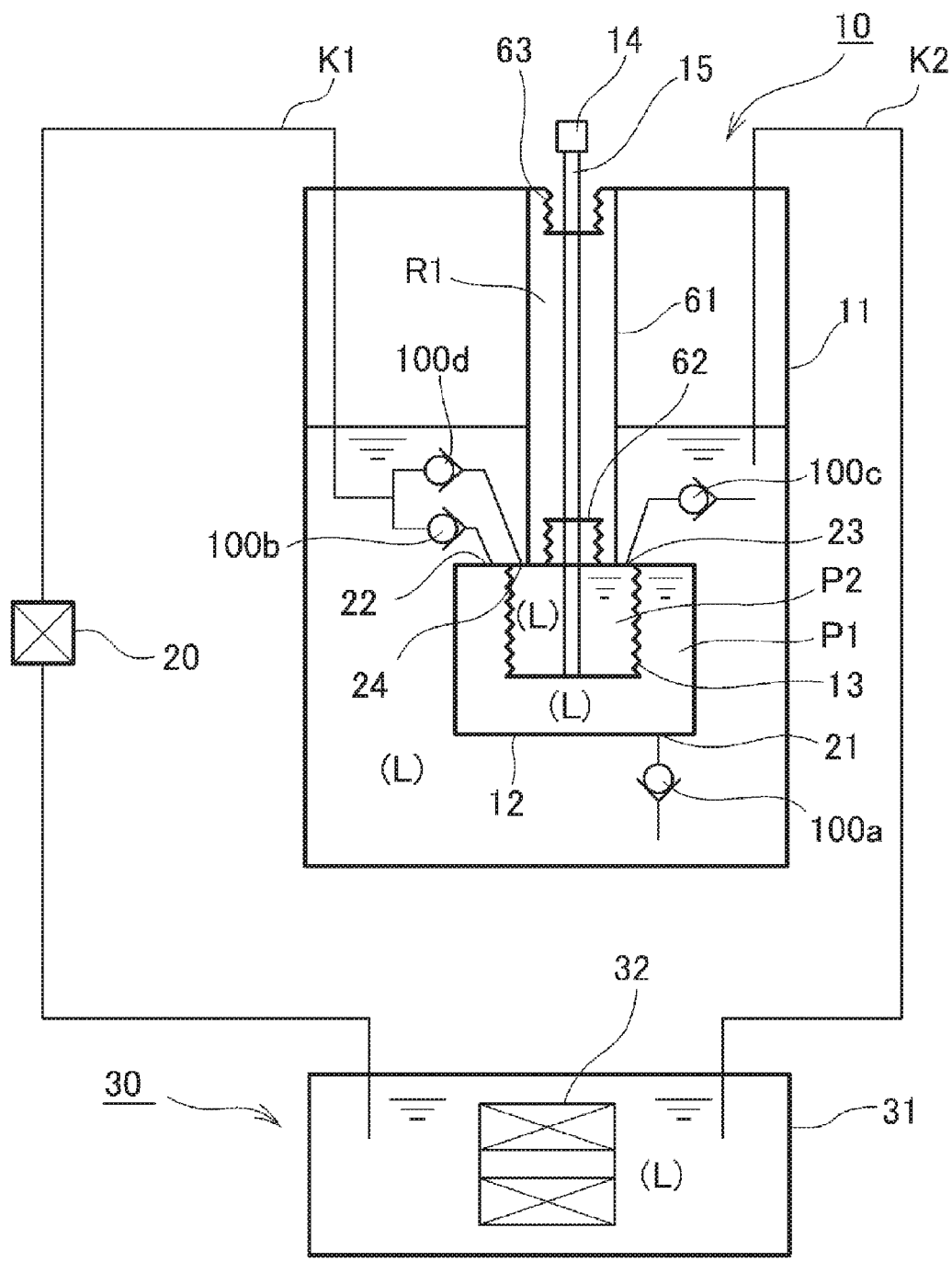
FIG. 3 is a schematic configuration diagram of a liquid supply system.

A liquid supply system having a check valve according to an example of the present disclosure is described with reference to FIG. 3. FIG. 3 is a schematic configuration diagram of the liquid supply system having the check valve according to the example of the present disclosure.

<Liquid Supply System>

A liquid supply system 10 is a low-temperature fluid pump apparatus, in which extremely cold liquid L is constantly supplied to a resin container 31 of a cooled device 30 having a superconducting coil 32, in order to keep the superconducting coil 32 in a superconducting state. Specific examples of the extremely cold liquid L include liquid nitrogen and liquid helium.

The liquid supply system 10 has a first container 11 for storing the extremely cold liquid L, a second container 12 that is disposed in the liquid L stored in the first container 11, and a bellows 13 placed inside the second container 12. A region outside the bellows 13 in the second container 12 configures a first pump chamber P1. The inside of the bellows 13 is an enclosed space which configures a second pump chamber P2. The second container 12 is provided with a first suction port 21 through which the liquid L of the first container 11 is introduced into the first pump chamber P1, and a first feed port 22 through which the introduced liquid L is fed from the first pump chamber P1 to a supply passage (supply pipe) K1 leading to the outside of the system. The second container 12 is also provided with a second suction port 23 through which the liquid L of the first container 11 is introduced into the second pump chamber P2, and a second feed port 24 through which the introduced liquid L is fed from the second pump chamber P2 to the supply passage K1. The first suction port 21 and the second suction port 23 are provided respectively with check valves 100a and 100c according to the present example, and the first feed port 22 and the second feed port 24 are provided respectively with check valves 100b and 100d according to the present example.

A shaft 15, configured to reciprocate by a linear actuator 4 functioning as a drive source, enters the bellows 13 from the outside of the first container 11, to have a tip thereof secured to a tip of the bellows 13. Thus, the reciprocal movement of the shaft 15 expands and contracts the bellows 13.

An enclosed space R1 filled with a gas is formed around the shaft 15. This enclosed space R1 is configured with a tubular (preferably cylindrical) pipe portion 61 that extends from the outside of the first container 11 to reach the bellows 13 and has the shaft 15 inserted therethrough, and small bellows 62 and 63 that are provided at a lower end portion and an upper end portion of this pipe portion 61 respectively. The small bellows 63 separating the enclosed space R1 from the second pump chamber P2 and the small bellows 63 separating the enclosed space R1 from the external space are secured to the shaft 15 at their tips and configured to expand and contract as the shaft 15 reciprocates. The small bellows 62, 63 are each configured to have an outer diameter smaller than that of the bellows 13.

The upper-end side of the bellows 13, too, is provided with the small bellows 62 as described above, so the inside of the bellows 13 is an enclosed space, which, as described above, configures the second pump chamber P2.

According to the foregoing configuration, when the bellows 13 contracts, the liquid L is fed from the second pump chamber P2 to the supply passage K1 through the second feed port 24 and introduced into the first pump chamber P1 through the first suction port 21. When the bellows 13 expands, the liquid L is introduced into the second pump chamber P2 through the second suction port 23 and fed from the first pump chamber P1 to the supply passage K1 through the first feed port 22. In either case where the bellows 13 contracts or expands, the liquid L is fed to the supply passage K1.

In the liquid supply system 10, as described above, the bellows 13 expands and contracts repeatedly, thereby supplying the liquid L to the cooled device 30 through the supply passage K1. There is also provided a return passage (return pipe) K2 that links the liquid supply system 10 and the cooled device 30. The return passage K2 is configured such that the liquid L returns to the liquid supply system 10 as much as is supplied to the cooled device 30. A cooler 20 is provided in the middle of the supply passage K1 in order to cool the liquid L to an extremely low temperature. According to such configuration, the liquid L that is cooled to an extremely low temperature by the cooler 20 circulates between the liquid supply system 10 and the cooled device 30.

As described above, in either case where the bellows 13 contracts or expands, the liquid L is fed to the supply passage K1, and the amount of liquid supplied by the expansion and contraction of the bellows 13 can be made twice the amount obtained by the pumping function of the first pump chamber P1 alone. Therefore, compared to when the pumping function of the first pump chamber P1 alone is fulfilled for a desired amount of liquid supplied, the amount of liquid supplied at once can be reduced to half, and consequently the maximum pressure of the liquid in the supply passage K1 can also be reduced to approximately half. As a result, the negative impact of a pressure fluctuation (pulsation) of the supplied fluid can be curbed.

In addition, the liquid L is supplied continuously, preventing the pulsation itself. Therefore, unlike a configuration in which a buffer (damper) is provided outside the system, space saving can be realized and areas where heat exchange takes place can be reduced, improving the cooling efficiency.

The enclosed space R1 of the tubular pipe portion 61 through which the shaft 15 is inserted is structured to be filled with a gas. Such structure allows the enclosed space R1 filled with a gas to function to hinder heat transfer, preventing heat or atmospheric heat generated by the linear actuator 14 from being transmitted to the liquid L. Even if the heat is transmitted to the liquid L, new liquid L is constantly supplied, bringing about the cooling effect and preventing the temperature inside the pump chambers from increasing to the temperature at which the liquid L evaporates. Therefore, the pumping function does not deteriorate.

Moreover, if by any chance heat or the like from the shaft 15 causes the liquid L of the bellows 13 to evaporate into a gas and consequently the pumping function of the second pump chamber P2 deteriorates, the pumping function of the first pump chamber P1 can stably be exerted. Furthermore, unlike when the inside of the bellows is filled with a gas (being compressible fluid), the configuration according to the present example has the liquid L (being non-compressible fluid) present both on the inside and outside of the bellows 13 and can therefore prevent the bellows 13 from whirling or buckling when the bellows 13 expands.

The enclosed space R1 is also configured with the pipe portion 61 and the pair of small bellows 62, 63. The small bellows 62, 63 are secured to the shaft 15 at their tips so as to be able to expand and contract as the shaft 15 reciprocates. Providing the enclosed space R1 without creating a sliding section can prevent generation of heat accompanied by a frictional resistance triggered by sliding.

The present example has described a configuration in which the enclosed space R1 is filled with a gas; however, a configuration can be employed in which the inside of the enclosed space R1 is evacuated. Evacuating the inside of the enclosed space R1 can further enhance the heat insulation effect.

<Check Valve>

Figure 1A:
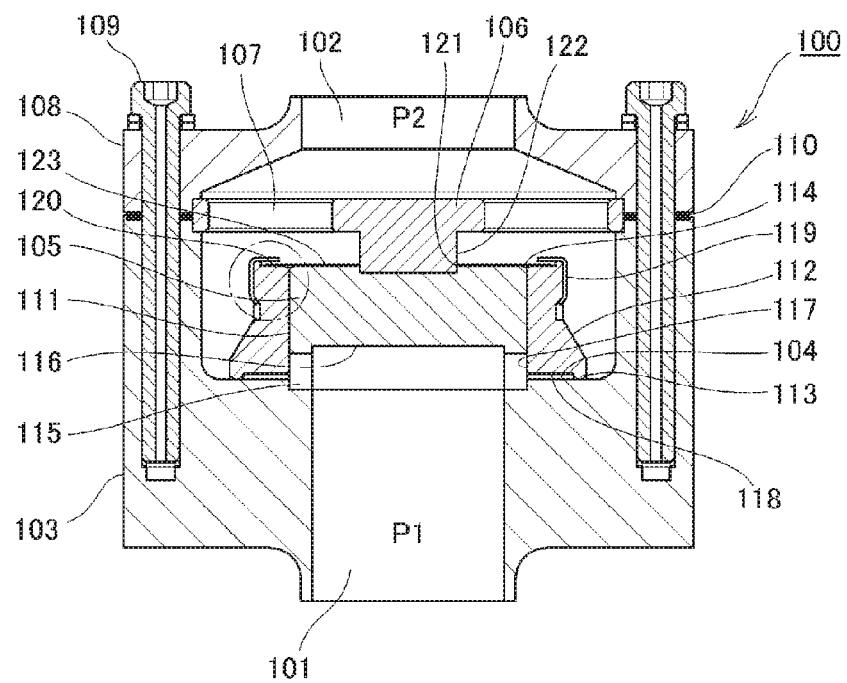
FIGS. 1A and 1B are schematic cross-sectional diagrams of a check valve according to Example 1 of the present disclosure.
Figure 1B:
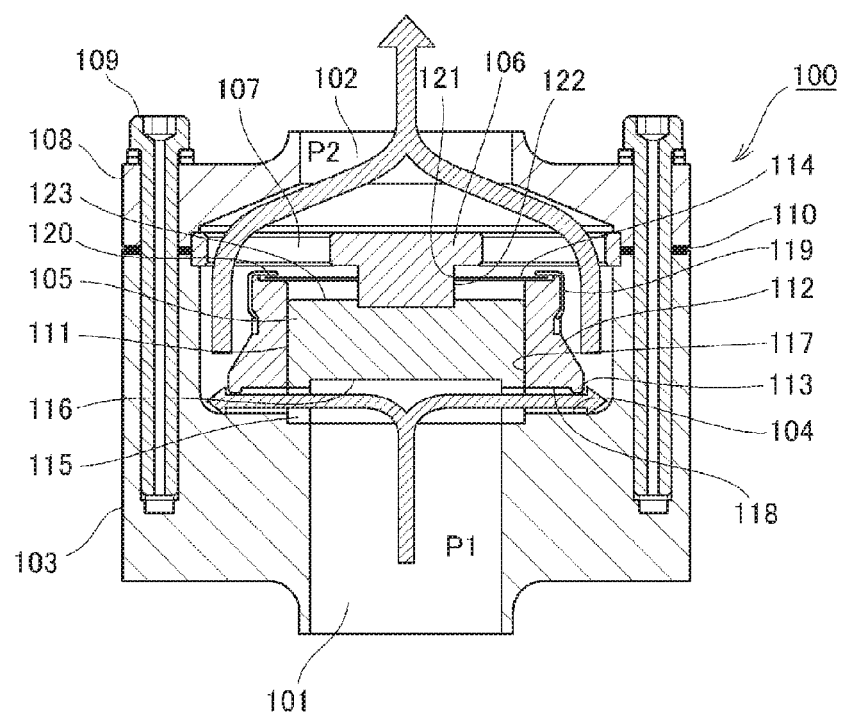
Figure 2:
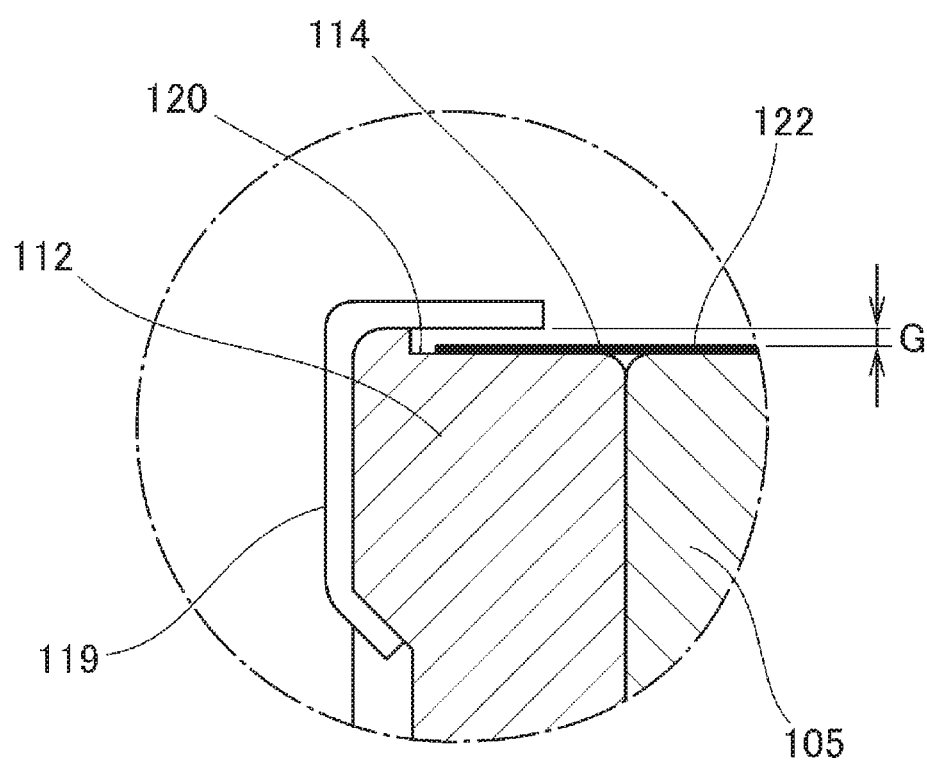
FIG. 2 is a partial enlarged view of FIG. 1.

A check valve according to Example 1 of the present disclosure is now described with reference to FIGS. 1A, 1B and 2. FIGS. 1A and 1B are schematic cross-sectional diagrams of the check valve according to Example 1 of the present disclosure, in which FIG. 1A shows a closed state of the valve and FIG. 1B shows an open state of the valve. FIG. 2 is a partial enlarged view of FIG. 1A, showing a configuration of the periphery of an auxiliary valve element.

A check valve 100 according to the present example is a one-way valve in which fluid (liquid L) flows in through an inlet 101 provided at the downside of the check valve and flows out of an outlet 102 provided at the upside of the check valve, allowing the fluid to flow only in a direction opposite to the gravitational direction (vertical direction). In case of a double reciprocating bellows pump for low-temperature fluid, such as the one shown in FIG. 3, the check valve 100 according to the present example is provided on two locations on the discharge side and two locations on the suction side.

<Configuration of the Check Valve>

A valve main body 103 formed generally into a cylinder, the inlet 101, and a valve seat 104 are formed in the check valve 100. The inlet 101 is opened upward in an internal region of the valve main body 103, and the valve seat 104 is formed into a horizontal annular shape in the outer circumference of the inlet 101. A column member 105 that functions as the guide portion is inserted into and positioned in a spigot joint portion provided between the inlet 101 and the valve seat 104, and is pressed down from above and secured by a metal holder 106.

The metal holder 106 has a plurality of holes 107 penetrating vertically and is mounted with its outer circumferential end being held securely between a substantially tubular lid 108 with the outlet 102 and the valve main body 103. The lid 108 and the valve main body 103 are joined to each other by a tightening member 109 such as a nut, and the joint surface therebetween is sealed with a gasket 110. A gasket for sealing the joint surface is generally a Teflon-type gasket but may be a metal gasket. The gasket may not be used, depending on the allowance of fluid leakage to the outside. The shape of the holes 107 is not particularly limited and therefore may have a circular (perfect circle, ellipse, etc.) or rectangular cross section; thus, various configurations can be employed.

A valve element 112, an annular member, is mounted on a guide surface (valve element guide surface) 111, which is an outer circumferential surface of the column member 105, so as to be able to move vertically (axially). The valve element 112 forms an annular sealing surface by bringing a projection 113, an annular abutting portion provided at the bottom of the valve element 112, to come into abutment with the annular valve seat 104, establishing the closed state. With the presence of this convex projection 113, the face pressure of the contact surface can be increased in the airtight state in which the valve element is seated on the valve seat 104. In addition, an auxiliary valve element 114 for sealing the gap between the valve element 112 and the column member 105 is mounted in the upper part of the valve element 112.

The column member 105 has, at its lower part, a cutout groove 115 formed in an axially symmetric manner and extending radially from the center of the column member 105, and forms, along with a lower surface 116, a guide flow path (fluid guide surface) for horizontally guiding the fluid that flows from the downside to the upside through the inlet 101.

For the purpose of enabling a smooth vertical movement, the valve element 112 is fitted (loose-fit), with a predetermined gap between the guide surface 111 of the column member 105 and an inner circumferential surface 117 functioning as a guided surface. In addition, an annular, horizontal pressure receiving surface 118 is formed on the inside of the projection 113.

The auxiliary valve element 114, a disk-shaped plate member with a hole at the center, is held by a retaining member 119, with a gap G therebetween that enables a vertical movement of the auxiliary valve element 114 within a predetermined range with respect to an upper surface 120 of the valve element 112 (FIG. 2). The auxiliary valve element 114 is also configured in such a manner that an inner circumferential surface 121 can come into vertically slidable contact with an outer circumferential surface 122 of the metal holder 106. The upper surface 120 of the valve element 112 and an upper surface 123 of the column member 105 are at the same height when the valve element 112 is seated. According to this configuration, the auxiliary valve element 114 can be seated on the upper surface 120 of the valve element 112 and the upper surface 123 of the column member 105 in such a manner as to cover the gap between the inner circumferential surface 117 of the valve element 112 and the guide surface 111 of the column member 105 with respect to the outlet 102. Basically the auxiliary valve element 114 may not only be a plate but may also be a hole, a groove, a cutout, and the like. Also, the sealing position can be adjusted by forming an uneven portion extending toward the center. In terms of not to inhibit the auxiliary valve element 114 from bending along (becoming deformed along) the uneven surface (the difference in height) between the upper surface of the valve element 112 functioning as the valve seat and the upper surface 123 of the column member 105 when the valve is closed, the size of the gap G formed between the retaining member 119 and the upper surface 120 of the valve element 112 is set to be the minimum possible size in anticipation of deformation of an outer circumferential portion of the auxiliary valve element 114 so that the outer circumferential portion is not confined (so that the outer circumferential portion can be deformed sufficiently). Even when the outer circumferential portion of the auxiliary valve element 114 is confined (fixed), the gap G does not have to be provided as long as deformation along the uneven portion of the valve seat is guaranteed.

Because the liquid supply system is used in an environment with extremely low temperature, the components configuring the check valve 100 according to the present example are preferably made of, in case of metals, austenitic stainless steel, titanium, or aluminum because these materials do not fracture at relatively low temperature. In case of resins, it is preferred that the components be made of PTFE, polyimide-based resin or other materials, the mechanical characteristics of which do not deteriorate significantly at low temperature. In addition, due to the temperature difference of 200° C. or higher between the normal temperature and the operating temperature as well as due to thermal contraction of the members under the operating temperature, it is preferred that the operating portions with gaps such as the valve element 112, the auxiliary valve element 114 and the column member 105 be made of the same material or of a combination of materials that increase the gaps. Moreover, the contact surface of the valve element or valve seat and the moving portions such as the valve element, auxiliary valve element or column member may be subjected to a heat treatment or a surface treatment (Teflon coating, silver plating, vapor deposition) in order to reduce wear.

<Closing/Opening Operation of Check Valve>

In the check valve 100, when the force caused by the fluid pressure P1 at the inlet 101 side becomes smaller than the force caused by the weight of the valve element 112 and the fluid pressure P2 at the outlet 102 side, the valve element 112 drops by its own weight, establishing the closed state. When the force caused by the fluid pressure P1 at the inlet 101 side becomes greater than the force caused by the weight of the valve element 112 and the fluid pressure P2 at the outlet 102 side, the valve element 112 is lifted off the valve seat 104, establishing the open state.

The fluid that flows from the downside to the upside through the inlet 101 is guided horizontally by the guide flow path configured by the groove 115 and lower surface 116 of the column member 105. An annular flow path is formed on the downstream side of a downstream opening (an opening on the outer circumferential side of the groove 115) of the guide flow path by the valve seat 104, the projection 113 of the valve element 112, the pressure receiving surface 118, and the outer circumferential surface (guide surface 111) of the column member 105. When the force that is applied to the valve element 112 due to the pressure P1 in this flow path becomes greater than the force that is applied to the valve element 112 due to the weight of the valve element 112 and P2, the valve element 112 rises and separates from the valve seat 104 as the pressure P1 is received by the pressure receiving surface 118. At this moment, the auxiliary valve element 114 is also lifted off the valve element 112 by the pressure P1 of the fluid flowing through the gap between the column member 105 and the valve element 112, forming a small flow path communicating the inlet 101 to the outlet 102. The auxiliary valve element 114 further separates from the upper surface 123 of the column member 105 while sliding along the outer circumferential surface 122 of the metal holder 106, as the valve element 112 rises.

Advantages of Present Example

Figure 12A:
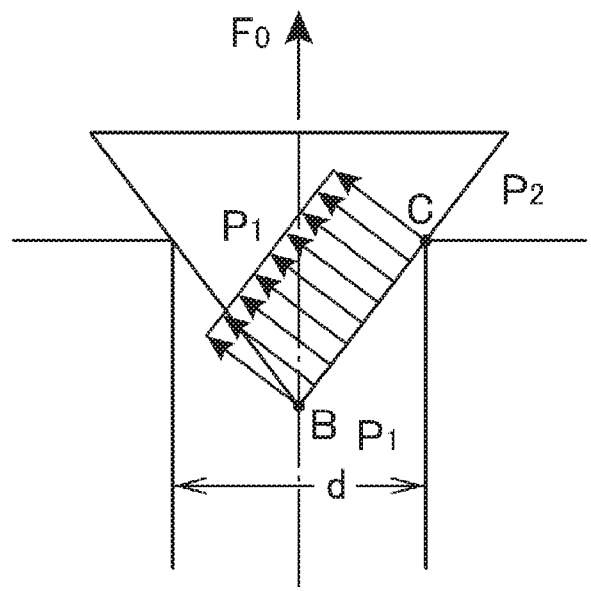
FIGS. 12A and 12B are schematic diagrams for explaining force acting on a valve element of a poppet valve.
Figure 12B:
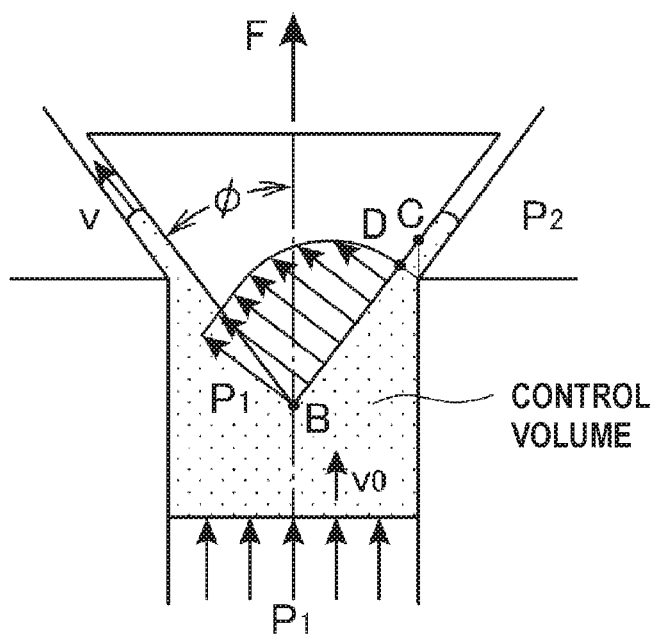

According to the valve structure of the check valve 100 according to the present example, the force acting on the valve element 112 is mostly the force that is caused by the differential pressure $\Delta P$ between the upstream pressure (P1) and the downstream pressure (P2) and acting on the pressure receiving surface 118, i.e., the annular region surrounded by the lower rim of the inner circumferential surface 117 of the valve element 112 and the projection 113. Although the projection 113 is subjected to a pressure acting radially outward, the level of the pressure is lower than that of the pressure received by the pressure receiving surface 118, thus having less impact on the behavior of the valve element 112. The momentum of the fluid acting on the valve element 112 is basically applied in the radial direction of the valve element 112 by the guide flow path described above so that the axial force acts slightly on the projection 113; hence it is lowered more significantly as compared to the poppet valve shown in FIGS. 12A and 12B. The valve element 112, therefore, is lifted mainly by the pressure received by the pressure receiving surface 118.

The momentum of the fluid acts in the radial direction in an axially symmetric manner and is therefore offset in terms of the force to be added to the valve element 112. In other words, the second term on the right side of the equation (3) that expresses the force F acting on the poppet valve is reduced significantly. As a result, the force that pushes up the valve element 112 becomes lower than that of the poppet valve; thus reducing the lift distance of the valve element 112. Consequently, the time it takes for the valve element 112 to drop from its position at the maximum lift distance to the valve-closed position by its own weight is shortened, reducing a delay of the closure timing.

As described above, high-speed pumping can be realized by reducing a delay of the closure timing of the check valve. This point is described below.

In case of a positive displacement pump such as the bellows pump shown in FIG. 3, the flow rate thereof has the following relation. Q=Vth×N×n In the foregoing equation, Q represents the flow rate [l/min], Vth represents the stroke volume [l], N represents the number of strokes [cpm], and n represents the volumetric efficiency.

According to this relation, when the flow rate is constant, the higher the number of strokes N is, the lower the required stroke volume Vth becomes. The lower the stroke volume Vth is, the lower the stroke volume of the bellows becomes. When the bellows stroke volume is low, the bellows effective area, which is obtained based on a possible bellows stroke as designed, can be reduced. Accordingly, rigidity that is required for the members involved in the operation of the bellows can be reduced by lowering the bellows test load obtained by a formula, "Bellows Effective Area (Ab)×

(Pump Discharge Pressure P)". As a result, the pump support member and a bellows operating shaft member can be made lighter.

Making the pump support member and the bellows operating shaft lighter can reduce the coefficient of heat transfer generated in the apparatus axial direction of the pump, resulting in a structural reduction of the amount of heat that enters the low-temperature liquid stored in the tank from the atmosphere. Such configuration is preferred because it can lower the evaporation rate of the low-temperature liquid and the necessary cooling capacity of, for example, a refrigerator.

The light-weighted, compact pump is preferred as it can improve the easiness to handle, the saving of installation space, the resistance to vibration, and the resistance to shock.

For these reasons, high-speed pumping (reducing the time required in one stroke) is favorable to a low-temperature pump. In high-speed pumping, a lag time of the closure timing of the check valve is largely related to the discharging performance (volumetric efficiency) of the pump. When there is a delay of the closure timing of the check valve (when the lag time is long), the fluid that is discharged (suctioned) during the lag time period of the closure of the check valve flows backwards, resulting in a reduction of the volumetric efficiency. In some cases, the impact of a water hammer caused by the closure of the valve during the reverse flow is not negligible. In case of accelerated pumping in which the time required in one stroke is reduced, when the lag time of the closure of the valve is equal to the time required in one stroke, the amount of liquid discharged and the reverse flow rate become substantially the same, which is the limit of the high-speed pumping. Thus, reducing the lag time of the closure of the check valve largely contributes to the improvement of the cycle of limiting the high-speed pumping.

According to the present example, therefore, high-speed pumping can be achieved by reducing a lag time of the closing of the check valve.

The present example employs the two-stage valve structure in which a gap is provided between the valve element 112 and the column member 105 to enable the valve element 112 to move smoothly and the gap is closed with the auxiliary valve element 114 after the valve element 112 is seated. According to this two-stage valve structure, the impact of a water hammer caused by the reverse flow of the liquid can be reduced more as compared with a one-stage valve structure. This is because after the reverse flow rate is reduced by the valve (the valve element 112) of the first stage, the valve of the second stage (the auxiliary valve element 114) is eventually closed, thereby reducing the velocity of the reverse flow at valve closure which is an indication of the magnitude of a water hammer.

Further, due to the configuration in which the position of the gap between the valve element 112 and the column member 105 is located outside the inlet 101 as viewed vertically (the gap does not vertically overlap with the inlet 101), the fluid that flows in through the inlet 101 firstly changes its flow direction to the horizontal direction and then flows into the gap. Consequently, the impact of the momentum of the fluid acting through the gap on the auxiliary valve element 114 can be reduced, resulting in a more effective reduction of the impact of a water hammer.

According to the valve structure of the present example, the pressure of opening the valve is determined based on the relationship between the flow rate and the weight of the valve element 112 without changing the size of the flow path on the inlet 101 side, by appropriately adjusting the sealing position of the valve element 112 (the position where the projection 113 comes into abutment with the valve seat 104) in the radial direction of the valve element 112. Therefore, the pressure of opening the valve can be adjusted properly.

The lift distance of the valve is also roughly determined based on the relationship between the flow rate and the weight of the valve element 112 without changing the diameter of the flow path on the inlet 101 side, by appropriately adjusting the sealing position of the valve element 112 in the radial direction of the valve element 112. Therefore, the lift distance of the valve can be adjusted properly.

In addition, the pressing force that is produced by ΔP generated at the time of closing the valve can be adjusted without changing the diameter of the flow path on the inlet 101 side, by appropriately adjusting the sealing position of the valve element 112 in the radial direction of the valve element 112. Because excessive level of pressing force expedites wear of the valve as a result of repeated contact between the valve element 112 and the valve seat 104, adjusting the pressing force can not only reduce wear but also improve durability of the valve.

<Modification>

Figure 4A:
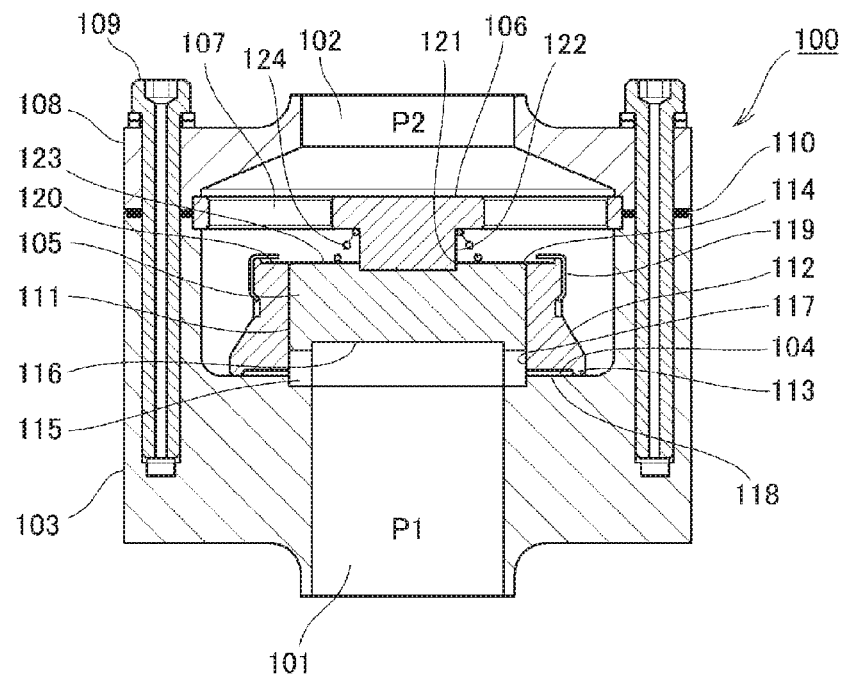
FIGS. 4A and 4B are schematic cross-sectional diagrams of a modification of the check valve according to Example 1 of the present disclosure.
Figure 4B:
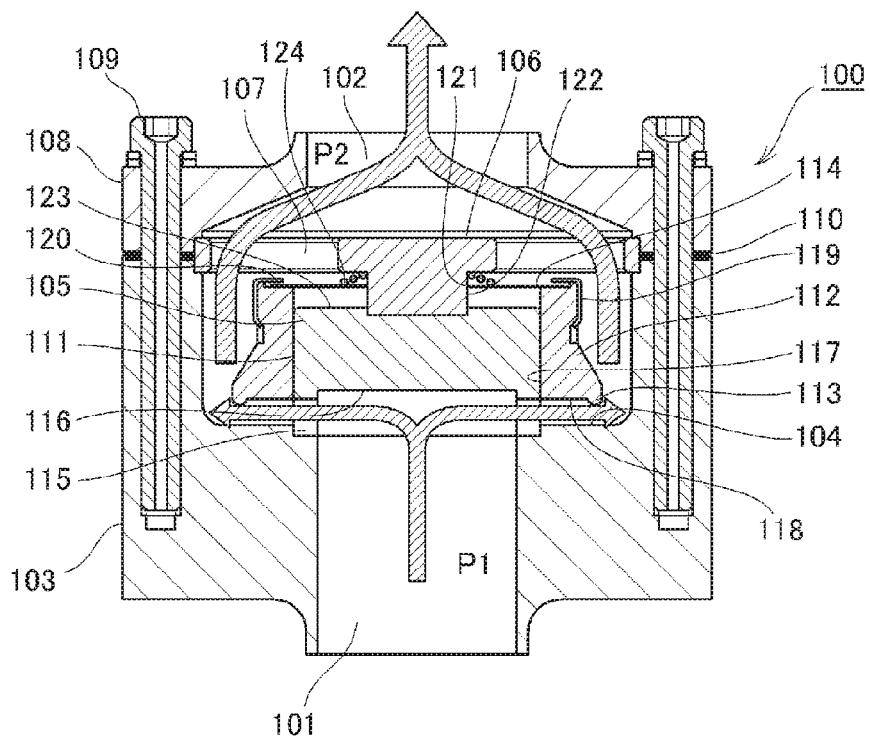

FIGS. 4A and 4B are schematic cross-sectional diagrams of a modification of the check valve of the present example, in which FIG. 4A shows a closed state of the valve and FIG. 4B shows an open state of the valve. As in the modification, a spring 124 functioning as the biasing member for biasing the auxiliary valve element 114 downward may be mounted vertically in a compressed state between the upper surface of the auxiliary valve element 114 and the lower end surface of the metal holder 106. According to this modification, the biasing force of the spring 124 acts on the valve element 112 through the auxiliary valve element 114 in a valve closing direction, facilitating a high-speed valve closing operation. In addition, by setting the spring load accordingly, the direction of installation of the check valve 100 can be made opposite to the gravitational direction. In other words, the fluid can be let flow in one direction from the upside to the downside.

Example 2

Figure 5A:
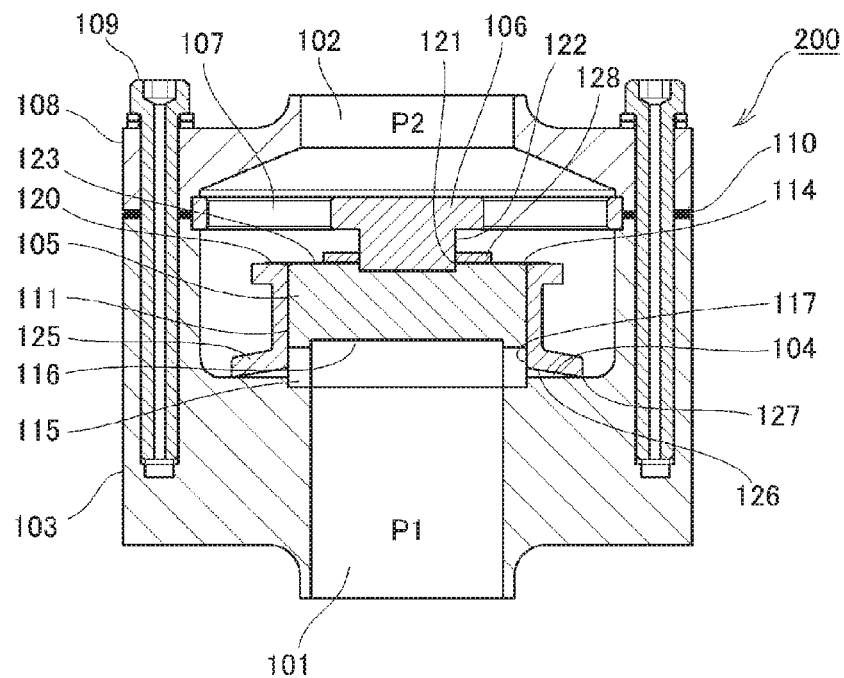
FIGS. 5A and 5B are schematic cross-sectional diagrams of a check valve according to Example 2 of the present disclosure.
Figure 5B:
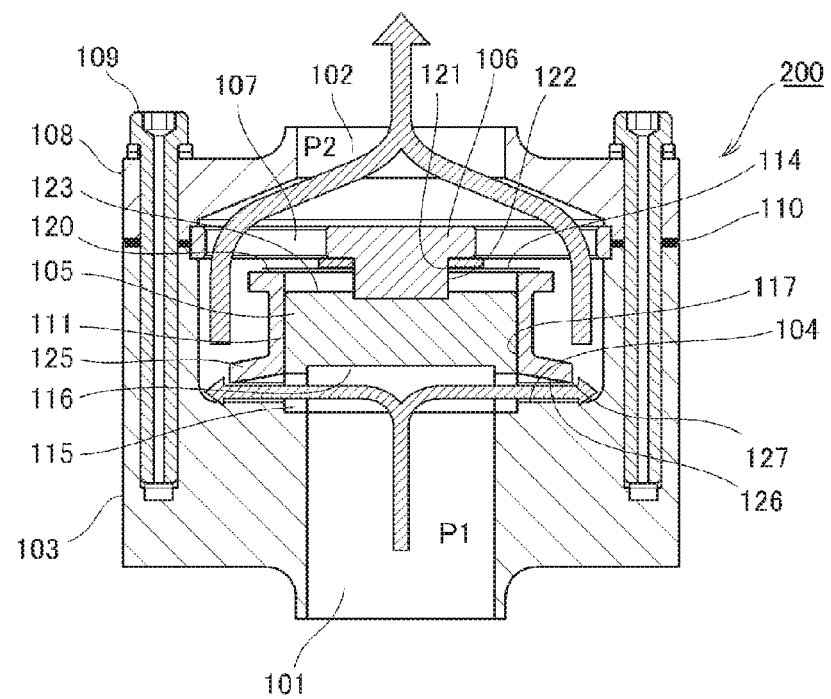

A check valve according to Example 2 of the present disclosure is described with reference to FIGS. 5A and 5B. FIGS. 5A and 5B are schematic cross-sectional diagrams of the check valve according to Example 2, in which FIG. 5A shows a closed state of the valve and FIG. 5B shows an open state of the valve. The following mainly discusses the differences from Example 1, in which the same reference numerals are used to describe the components same as those of Example 1, and the descriptions thereof are omitted accordingly. The matters that are not described below are the same as those of Example 1.

A check valve 200 according to the present example has a different configuration of a valve element from that of the check valve 100 of Example 1. A valve element 125 of the present example has a tapered pressure receiving surface 126. The pressure receiving surface 126 is an inclined surface extending from the lower end of the inner circumferential surface of the valve element 125 in such a manner that the distance between the pressure receiving surface 126 and the valve seat 104 in the vertical direction gradually reduces toward the outer diameter, in which the outer circumferential end of the pressure receiving surface 126 configures an annular abutting portion 127 that is in abutment with the valve seat 104. In this configuration, as in Example 1, the level of the force caused by the momentum of the fluid and acting on the valve element 125 can be reduced.

The angle of the pressure receiving surface 126 is set to an angle in which a horizontal force component of the force acting on the pressure receiving surface 126 becomes greater than a vertical force component, i.e., an angle in which the level of the force caused by the momentum of the fluid and acting on the valve element 125 can be lowered as much as possible. For instance, the angle of the pressure receiving surface 126 can be set to an angle as shallow as 10° with respect to a horizontal plane. From the same perspective, the height of the projection 113 according to Example 1 may be set to have approximately the same height difference with the pressure receiving surface 118 as the height difference between the inner circumferential end and the outer circumferential end of the tapered surface.

The pressure receiving surface 126 may be configured as a reverse tapered surface, i.e., an inclined surface that extends from the lower end of the inner circumferential surface of the valve element 125 in such a manner that the distance between the pressure receiving surface 126 and the valve seat 104 in the vertical direction gradually increases toward the outer diameter. It should be noted that the angle of the pressure receiving surface 126 is set so as not to increase the level of the force that acts radially outward on the inner circumferential surface of the abutting portion 127, i.e., the force caused by the momentum of the fluid and acting on the valve element 125.

Further, in the present example, a spacer 128 is used to regulate the range of vertical movement of the auxiliary valve element 114, without using the retaining member 119 of Example 1. The spacer 128 is secured to the upper surface of the auxiliary valve element 114 and has a predetermined thickness. This configuration can reduce the impact of a water hammer caused when the fluid flows backward, as with Example 1.

Comparative Experiments

Figure 6:
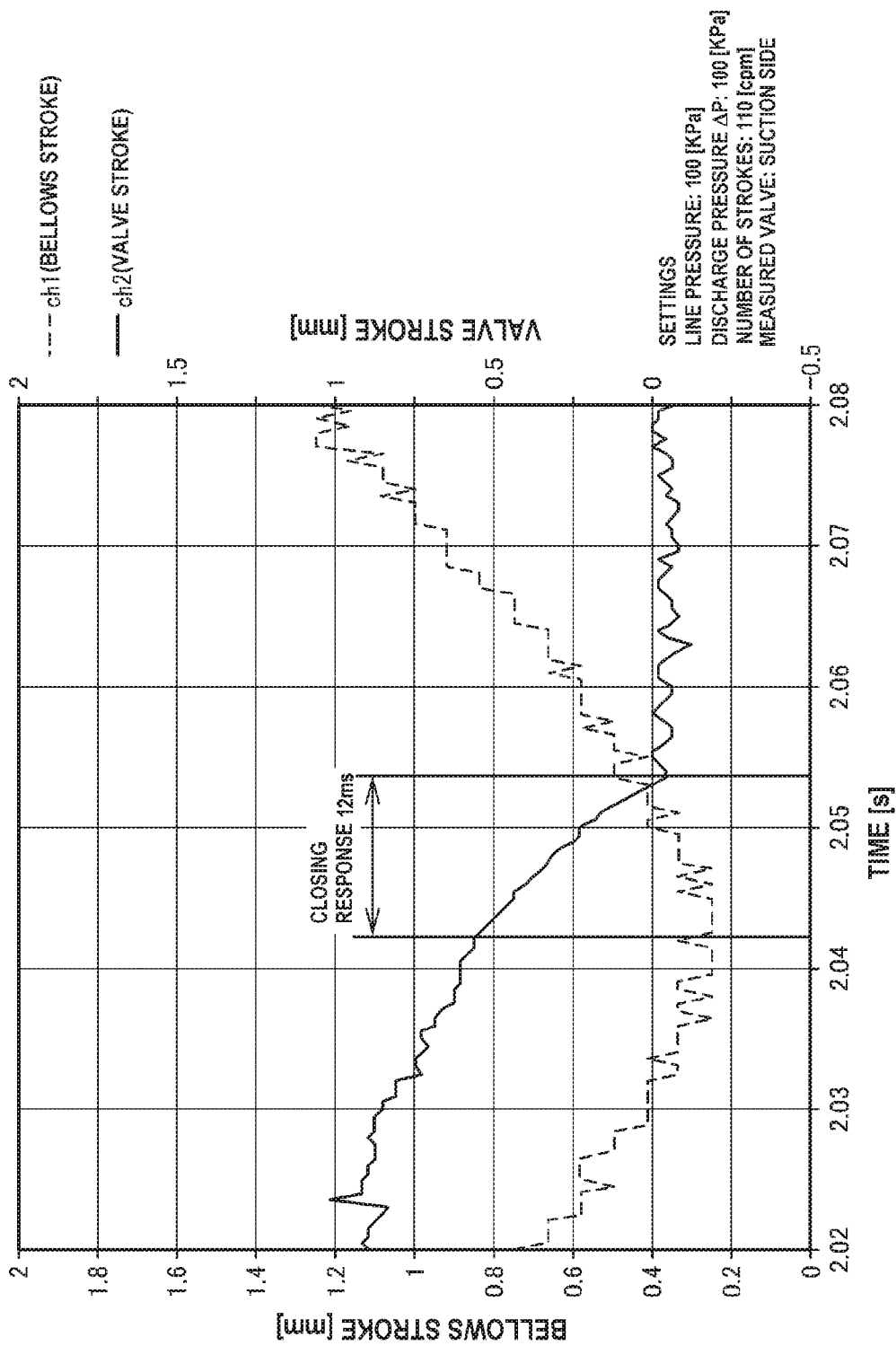
FIG. 6 shows a measurement result of a closing response time of the check valve according to Example 2 of the present disclosure.
Figure 7:
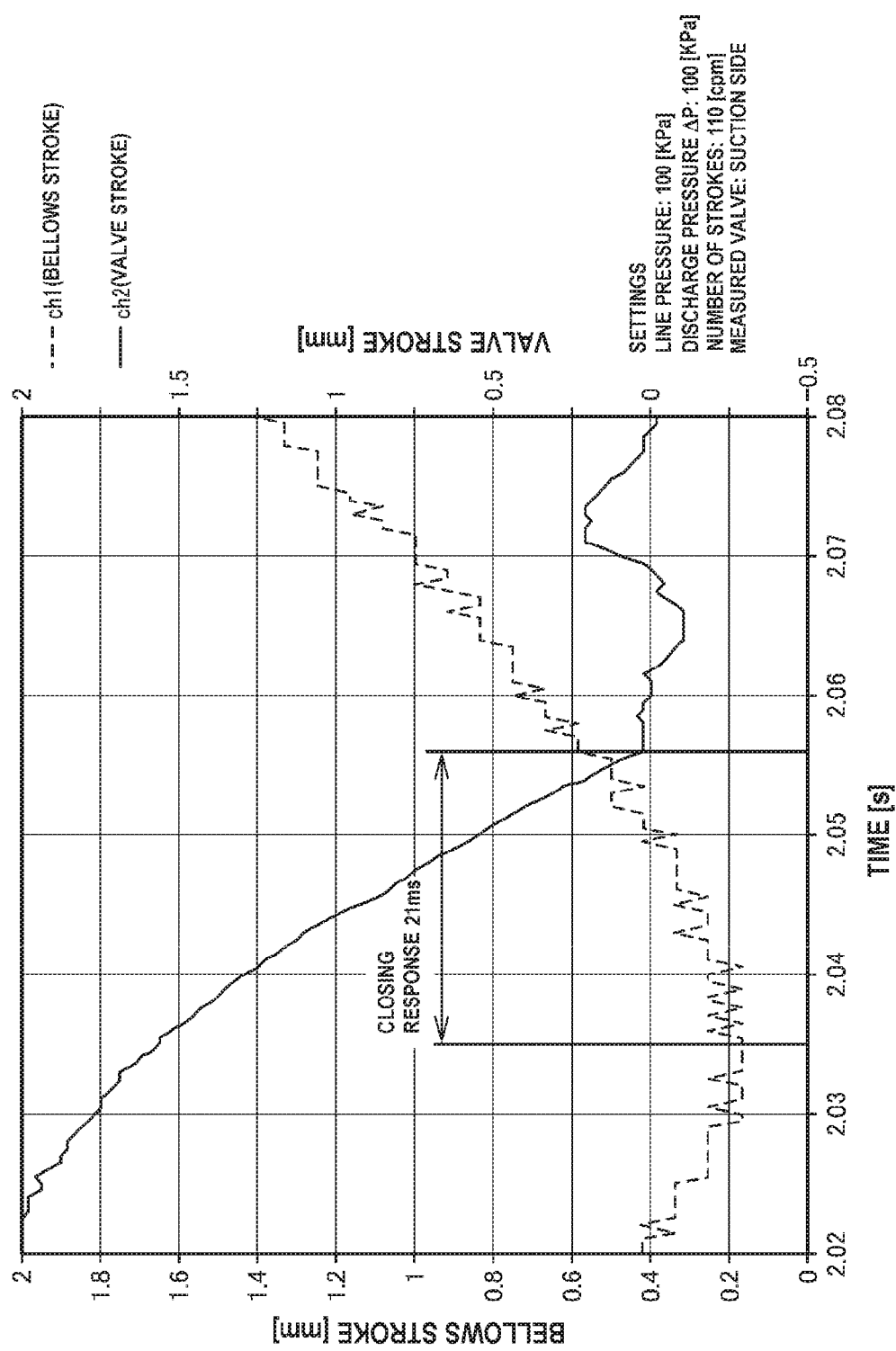
FIG. 7 shows a measurement result of a closing response time according to a conventional check valve.
Figure 8:
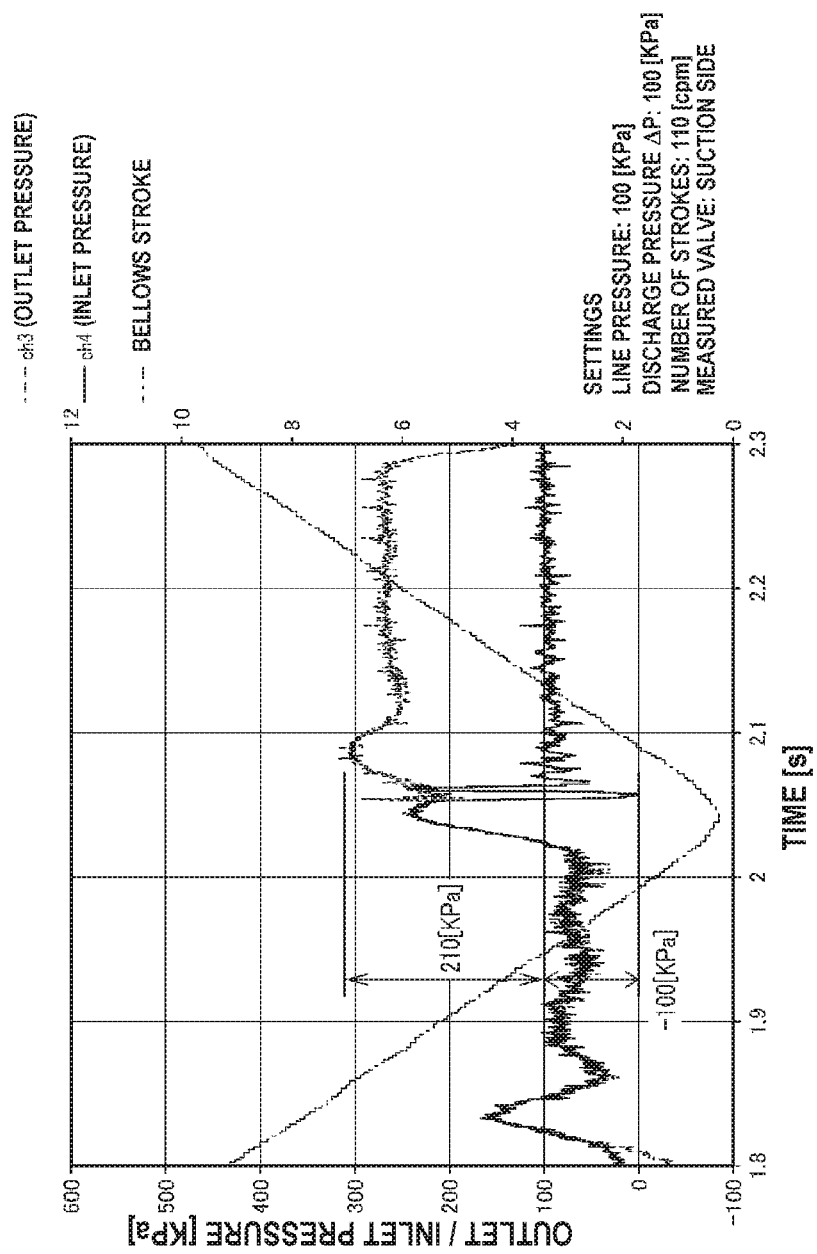
FIG. 8 shows a measurement result of water hammer force in the check valve according to Example 2 of the present disclosure.
Figure 9:
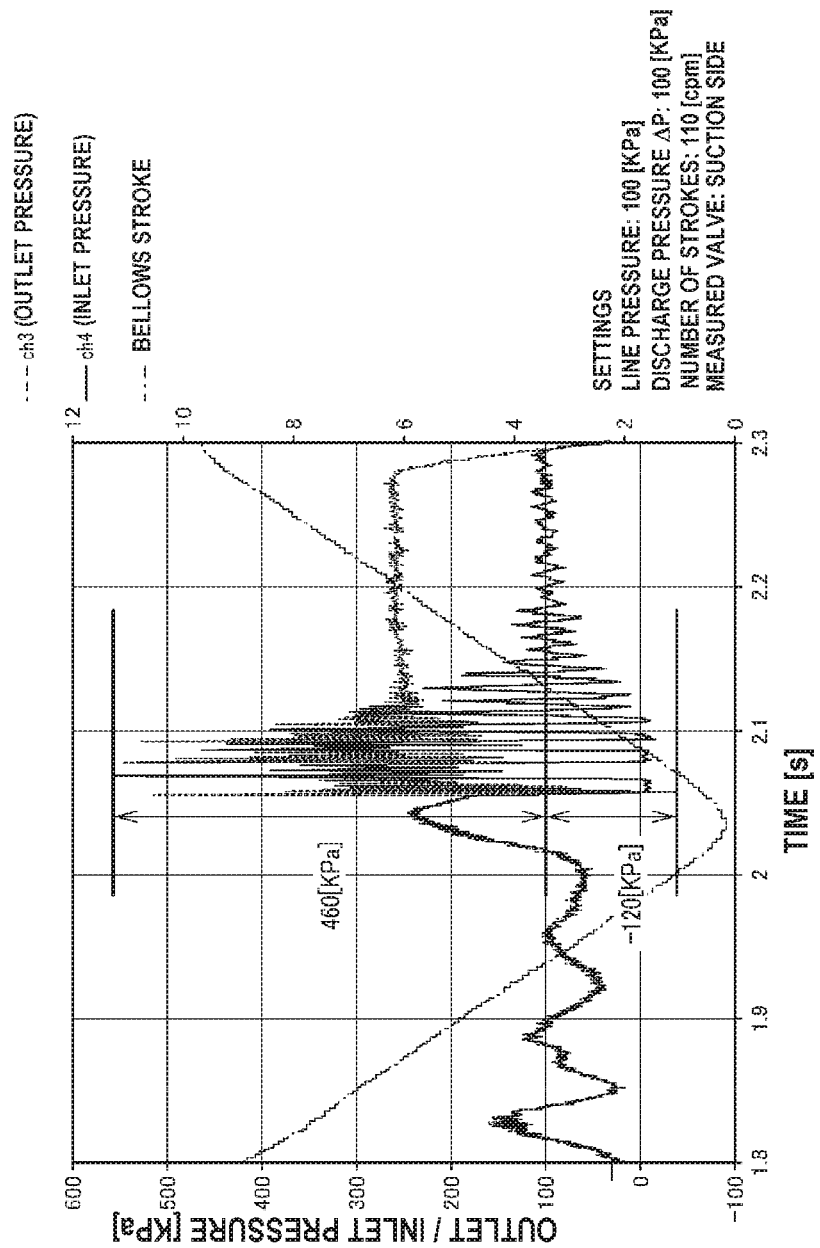
FIG. 9 shows a measurement result of the level of water hammer force in the conventional check valve.

With reference to FIGS. 6 to 9, the following describes the effects of shortening the closing response time and the effects of reducing the impact of a water hammer according to the present example. FIG. 6 is a diagram showing a measurement result of the closing response time of the check valve according to Example 2. FIG. 7 is a diagram showing a measurement result of the closing response time of a conventional check valve. FIG. 8 is a diagram showing a measurement result of the level of the impact of a water hammer in the check valve according to Example 2. FIG. 9 is a diagram showing a measurement result of the level of the impact of a water hammer in the conventional check valve.

A check valve in which the angle of the tapered surface is approximately 10°, the pressure receiving area is approximately 10 cm$^2$, the maximum operating range of the valve element is approximately 3 mm, and the effective diameter of the valve element is 25 mm, was used as the check valve of the present example. Also, a poppet valve having the same effective diameter as the check valve of the present example was used as the conventional check valve.

<<Comparison of Closing Response Times>>

The strokes of the bellows and valve element (valve) in the check valve of the present example and the puppet valve as the conventional valve were measured with a displacement meter, and the time it took for the valve element to drop from the lowest point (bottom dead center) of the bellows stroke to its seating point was measured as the closing response time. While the closing response time of the conventional poppet valve was 21 ms as shown in FIG. 7, the closing response time of the check valve of the present example was 12 ms as shown in FIG. 6, a considerable reduction of the closing response time.

<<Comparison of Levels of Water Hammers>>

Pressure gauges were installed at the upstream side and the downstream side of each valve element (valve), to measure a water hammer pressure generated at valve closure. As shown in FIG. 9, in the conventional poppet valve, a pressure of −120 KPa was generated at the inlet side with respect to a line pressure (100 KPa), whereas at the outlet side, a pressure of +460 KPa was generated with respect to the line pressure. In the check valve of the present example, on the other hand, the pressure generated at the inlet side was −100 KPa with respect to the line pressure, whereas the pressure generated at the outlet side was +210 KPa with respect to the line pressure, as shown in FIG. 8, meaning that the impact of the water hammer was reduced significantly.

Example 3

Figure 10A:
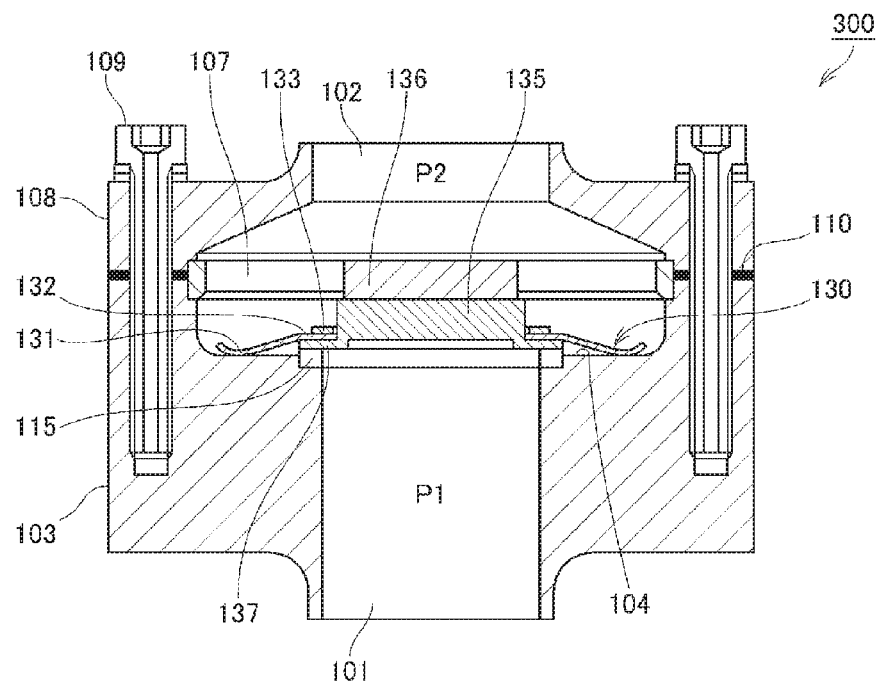
FIGS. 10A and 10B are schematic cross-sectional diagrams showing a check valve according to Example 3 of the present disclosure.
Figure 10B:
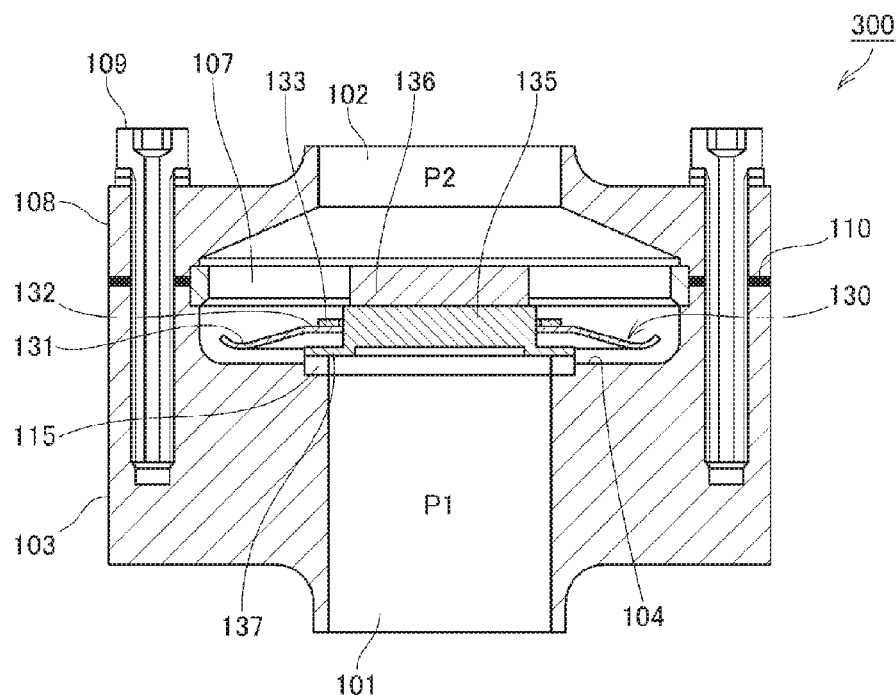
Figure 11A:
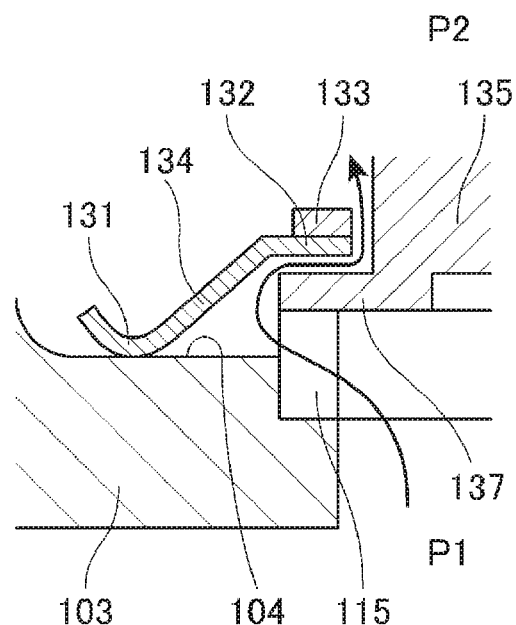
FIGS. 11A and 11B are partial enlarged views of FIG. 10A.
Figure 11B:
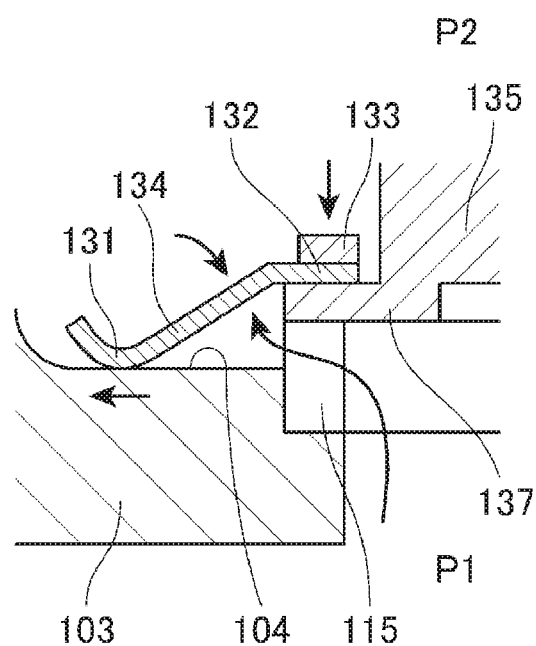

A check valve according to Example 3 of the present disclosure is now described with reference to FIGS. 10A to 11B. FIGS. 10A and 10B are schematic cross-sectional diagrams of the check valve according to Example 3 of the present disclosure, in which FIG. 10A shows a closed state of the valve and FIG. 10B shows an open state of the valve. FIGS. 11A and 11B are partial enlarged views of FIG. 10A, showing the configuration of the periphery of the valve element, in which FIG. 11A shows a state where only a first valve portion is closed and FIG. 11B shows a state in which the first valve portion and a second valve portion are closed. The following mainly discusses the differences from Example 1 and Example 2, in which the same reference numerals are used to describe the components same as those of Examples 1 and 2. The matters that are not described below are the same as those of Examples 1 and 2.

A check valve 300 according to the present example has different configurations of a valve element and a column member from those of the check valves 100 and 200 according to Examples 1 and 2 and does not have an auxiliary valve element. As shown in FIGS. 10A and 10B, a valve element 130 of the present example has a first valve portion 131 with a large diameter, a second valve portion 132 with a small diameter, and an inclined portion 134 that stretches out in the form of an umbrella from the second valve portion 132 and continues to the first valve portion 131. An annular weight 133 is connected to the upper surface of the second valve portion 132. The valve element 130 is made of an elastically deformable material, such as SUS or resin, which is not affected by the fluid inside.

The first valve portion 131 of the valve element 130 is seated on the valve seat 104 to form a first annular sealing surface. The lower surface of the inclined portion 134 of the valve element 130 configures a tapered pressure receiving surface. A column member 135 of the present example has a flange portion 137 at its lower end, in which the upper surface of the flange portion 137 configures a valve seat for the second valve portion 132 of the valve element 130. The lower surface of the flange portion 137 functions as the fluid guide surface for guiding the fluid that flows in through the inlet 101 radially outward. The second valve portion 132 is seated on the upper surface of the flange portion 137, configuring a second annular sealing surface. Note that a metal holder 136 of the present example has a different shape from the metal holder 106 of Examples 1 and 2 but satisfies the same required function.

In the check valve 300, when the force caused by the fluid pressure P1 at the inlet 101 side becomes smaller than the force caused by the weight of the valve element 130 and the fluid pressure P2 at the outlet 102 side, the valve element 130 drops by its own weight, establishing the closed state. The weight 133 is provided to allow the valve element 130 to drop by its own weight, and the weight of the valve element itself may be adjusted by providing a thick portion in the second valve portion 132 instead of providing the weight 133.

At valve closure, the first valve portion 131 is seated on the valve seat 104 first but the second valve element 132 is not seated, as shown in FIG. 11A. Subsequently, the entire valve element 130 creates elastic deformation based on the seated first valve portion 131, whereby the second valve portion 132 is seated on the upper surface of the flange portion 137.

Specifically, as shown in FIG. 11B, the periphery of the first valve portion 131 that is first seated creates diametrically expanding deformation, which shifts the seating position of the first valve portion 131 to the outside (the sealing surface expands diametrically), and the inclined portion 134 deforms by bending inward. At the same time, the second valve portion 132 and the weight 133 drop while slightly creating diametrically contracting deformation and are seated on the upper surface of the flange portion 137. As there is a gap between the inner circumferential surface of the second valve portion 132 and the outer circumferential surface of the column member 135, an annular flow path is formed. At valve closure, the second valve portion 132 is seated on the upper surface of the flange portion 137 while narrowing down the annular flow path.

At valve opening, when the force caused by the fluid pressure P1 at the inlet 101 side becomes greater than the force caused by the weight of the valve element 130 and the fluid pressure P2 at the outlet 102 side, the first valve portion 131 and second valve portion 132 of the valve element 130 are lifted off the valve seat 104 and the upper surface of the flange portion 137, establishing the open state.

The check valve 300 according to the present example has the two-stage valve structure in which the second valve portion 132 is closed after the first valve portion 131 is closed. Furthermore, the direction in which the fluid flows in the first valve portion 131 and the direction in which the fluid flows in the second valve portion 132 are opposite to each other. In other words, the fluid that flows in through the inlet 101 changes its flow direction to a horizontally outward direction first, then changes its flow direction to a horizontally inward direction, and then flows into the second valve portion 132. The lower surface of the inclined portion 134 configuring the pressure receiving surface extends from the inner circumference of the valve element 130 in such a manner that the distance between the inclined portion 134 and the valve seat 104 in the vertical direction gradually reduces toward the outer diameter. Owing to this configuration, the present example can reduce the level of the force produced by the momentum of the fluid and acting on the valve element 130, as in Examples 1 and 2.

With respect to the above described examples, it is possible to employ the constituent components of each of the examples in combination.

REFERENCE SIGNS LIST

Check valve 100
Inlet 101
Outlet 102
Valve main body 103
Valve seat 104
Column member (guide portion) 105
Metal holder 106
Hole 107
Lid 108
Guide surface (valve element guide surface) 111
Valve element 112
Projection (abutting portion) 113
Auxiliary valve element 114
Groove 115
Pressure receiving surface 118
Retaining member 119

The invention claimed is:

1. A check valve that opens and closes by causing a valve element to come into contact with and separate from a valve seat and thereby controls a flow of fluid that flows in through an inlet and flows out through an outlet, the check valve comprising:
   an inlet provided at a downside thereof;
   an outlet provided at an upside thereof;
   a valve seat formed to surround the inlet;
   a valve element configured to be able to come into contact with and separate from the valve seat vertically;
   a guide portion that has a fluid guide surface provided at a downside thereof, the fluid guide surface horizontally guiding a fluid flowing in through the inlet, and a valve element guide surface provided on a side surface thereof, the valve element guide surface vertically guiding the valve element; and
   an auxiliary valve element that is configured to be able to be seated on the valve element and the guide portion so as to cover a gap between the valve element and the valve element guide surface when the valve element is seated on the valve seat.

2. The check valve according to claim 1, wherein
   the auxiliary valve element is mounted to the valve element so as to be able to move vertically within a predetermined range, and
   a seating surface of the valve element on which the auxiliary valve element is seated and a seating surface of the guide portion on which the auxiliary valve element is seated are at a same height when the valve element is seated on the valve seat.

3. The check valve according to claim 1, further comprising a biasing member for biasing the auxiliary valve element downward toward the valve element and the guide portion.

4. The check valve according to claim 1, wherein the valve element has a pressure receiving surface that extends outward from a lower end of an inner side surface guided by the valve element guide surface, and extends horizontally with respect to the valve seat.

5. The check valve according to claim 1, wherein the valve element has a pressure receiving surface that extends outward from a lower end of an inner side surface guided by the valve element guide surface, in such a manner that a distance between the pressure receiving surface and the valve seat gradually reduces.

6. The check valve according to claim 1, wherein a position of a gap between the valve element and the guide portion is located outside the inlet as viewed vertically.

7. The check valve according to claim 2, further comprising a biasing member for biasing the auxiliary valve element downward toward the valve element and the guide portion.

8. The check valve according to claim 1, further comprising a biasing member for biasing the auxiliary valve element downward toward the valve element and the guide portion.

9. The check valve according to claim 2, wherein the valve element has a pressure receiving surface that extends outward from a lower end of an inner side surface guided by the valve element guide surface, and extends horizontally with respect to the valve seat.

10. The check valve according to claim 3, wherein the valve element has a pressure receiving surface that extends outward from a lower end of an inner side surface guided by the valve element guide surface, and extends horizontally with respect to the valve seat.

11. The check valve according to claim 2, wherein the valve element has a pressure receiving surface that extends outward from a lower end of an inner side surface guided by the valve element guide surface, in such a manner that a distance between the pressure receiving surface and the valve seat gradually reduces.

12. The check valve according to claim 3, wherein the valve element has a pressure receiving surface that extends outward from a lower end of an inner side surface guided by the valve element guide surface, in such a manner that a distance between the pressure receiving surface and the valve seat gradually reduces.

13. The check valve according to claim 2, wherein a position of a gap between the valve element and the guide portion is located outside the inlet as viewed vertically.

14. The check valve according to claim 3, wherein a position of a gap between the valve element and the guide portion is located outside the inlet as viewed vertically.

15. The check valve according to claim 4, wherein a position of a gap between the valve element and the guide portion is located outside the inlet as viewed vertically.

16. The check valve according to claim 5, wherein a position of a gap between the valve element and the guide portion is located outside the inlet as viewed vertically.

* * * * *